United States Patent
Jung et al.

(10) Patent No.: US 12,403,891 B2
(45) Date of Patent: Sep. 2, 2025

(54) METHOD AND APPARATUS FOR CONTROLLING INVERTER OF ECO-FRIENDLY VEHICLE BASED ON BABY MODE

(71) Applicants: Hyundai Motor Company, Seoul (KR); Kia Corporation, Seoul (KR)

(72) Inventors: Sung Il Jung, Busan (KR); Hui Un Son, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 374 days.

(21) Appl. No.: 18/074,980

(22) Filed: Dec. 5, 2022

(65) Prior Publication Data
US 2023/0219559 A1 Jul. 13, 2023

(30) Foreign Application Priority Data
Jan. 7, 2022 (KR) .................. 10-2022-0002544

(51) Int. Cl.
*B60W 20/17* (2016.01)
*G10K 15/02* (2006.01)

(52) U.S. Cl.
CPC .............. *B60W 20/17* (2016.01); *G10K 15/02* (2013.01)

(58) Field of Classification Search
CPC ........ B60W 20/17; G10K 15/02; B60L 15/08; B60L 2270/142; B60L 15/20; B60L 53/20; B60L 2210/42; B60L 2240/421; B60L 2270/14; H02M 1/44; H02M 7/53871; H02M 7/5395; H02M 7/42; H04R 1/22; B60Y 2200/91; Y02T 10/70; Y02T 90/40
See application file for complete search history.

(56) References Cited

FOREIGN PATENT DOCUMENTS

| JP | 2008022671 A | * | 1/2008 |
| JP | 2018019515 A | * | 2/2018 |
| JP | 2021078212 A | * | 5/2021 |
| KR | 10-2018-0043770 A | | 4/2018 |
| KR | 10-2018-0065518 A | | 6/2018 |
| KR | 10-2018-0069209 A | | 6/2018 |
| KR | 10-2018-0126125 A | | 11/2018 |

OTHER PUBLICATIONS

English translation of JP-2021078212-A (Year: 2021).*
English translation of JP-2018019515-A (Year: 2018).*
Machine translation of Hisashi (JP 2008022671 A) (Year: 2008).*

* cited by examiner

*Primary Examiner* — Justin S Lee
*Assistant Examiner* — Alexander George Matta
(74) *Attorney, Agent, or Firm* — Banner & Witcoff, Ltd.

(57) ABSTRACT

Disclosed are a method and apparatus for controlling an inverter of an eco-friendly vehicle, which may generate noise outside of a frequency band audible to infants in a protection mode. The control method includes calculating a current noise frequency, determining whether the current noise frequency is higher than a target noise frequency, and changing a current inverter switching frequency based on the real-time motor rotation frequency to generate noise corresponding to the target noise frequency when the current noise frequency is lower than the target noise frequency. Accordingly, it may be possible to prevent noise generated when the eco-friendly vehicle is driven from affecting the sense of hearing of an infant in the vehicle, whose audible frequency band is higher than that of an adult, thereby preventing hearing loss of the infant.

18 Claims, 5 Drawing Sheets

METHOD AND APPARATUS FOR CONTROLLING INVERTER OF ECO-FRIENDLY VEHICLE BASED ON BABY MODE

This application claims the benefit of Korean Patent Application No. 10-2022-0002544, filed on Jan. 7, 2022, which is hereby incorporated by reference as if fully set forth herein.

BACKGROUND

Field

The present disclosure relates to a method and apparatus for controlling an inverter of a vehicle (e.g., an eco-friendly vehicle), and more particularly to a method and apparatus for controlling an inverter of an eco-friendly vehicle, which may generate noise outside of a frequency band audible to people under a certain age (e.g., infants).

Discussion of the Background

With increasing concern about atmospheric pollution, a growing number of people tend to choose eco-friendly vehicles (xEV), such as fuel cell vehicles.

Such an eco-friendly vehicle generates vehicle-driving force using a motor, rather than an engine. In order to drive the motor, the eco-friendly vehicle may be equipped with an inverter or other automotive parts. The automotive parts (e.g., an inverter) may drives the motor using a switching element, and may employ a switching frequency of 10 kHz in many implementations.

In general, a frequency band audible to adults is known to be 20 Hz to 17 kHz, whereas a frequency band audible to infants is known to be a frequency band including 20 kHz. In some cases, however, infants can hear sound having a frequency up to 28 kHz. Therefore, when the eco-friendly vehicle is driven, an infant may hear high-frequency noise that is not audible to the human ear of an adult driver. Auditory organs of infants or children from six months to six years of age may rapidly suffer damage depending on the surrounding environment, resulting in hearing loss.

SUMMARY

To address one or more problems discussed above, the present disclosure provides a method and apparatus for controlling an inverter of an eco-friendly vehicle based on a protection mode.

A method may comprise: determining, by an apparatus, a noise frequency associated with an inverter of a vehicle; determining that the noise frequency does not satisfy a target noise frequency; and changing, based on a motor rotation frequency, a switching frequency of the inverter to generate a noise satisfying the target noise frequency.

The apparatus may generate, based on the changed switching frequency, a pulse-width modulation (PWM) signal to control an operation of the inverter. The apparatus may activate a protection mode associated with one or more protection targets in the vehicle; set, based on the protection mode, the target noise frequency; and acquire the motor rotation frequency and the switching frequency of the inverter in real time while the vehicle is traveling. The one or more protection targets may comprise at least one of: an infant in the vehicle; a toddler in the vehicle; a child in the vehicle; or a fetus of a pregnant woman in the vehicle. The setting the target noise frequency may comprise: generating an audible frequency; outputting a sound having the audible frequency; determining a reaction of the one or more protection targets; and outputting, based on the determined reaction, a sound having an increased audible frequency. The changing the switching frequency of the inverter may comprise changing, at a rate settable by a user, the switching frequency of the inverter. The changing the switching frequency of the inverter may comprise changing the switching frequency of the inverter by increasing the switching frequency at a fixed rate. The determining the noise frequency associated with the inverter of the vehicle may comprise sensing a sound using a microphone. The microphone may comprise a filter configured to pass frequencies in a configured audible frequency band.

An apparatus may comprise: a battery configured to supply direct current (DC) power for a vehicle; an inverter configured to convert the DC power to alternating current (AC) power; a driving motor, based on the AC power, configured to operate the vehicle; at least one sensor; and a controller configured to control, based on sensing data provided from the at least one sensor, a switching frequency of the inverter to generate a noise satisfying a target noise frequency.

The controller may be configured to control a switching operation time of a switching element of the inverter. The switching element may comprise an insulated gate bipolar transistor (IGBT). The at least one sensor may comprise: a motor sensor configured to sense a driving frequency of the driving motor; a switching frequency sensor configured to sense a switching frequency of the switching element of the inverter; an ultrasonic sensor configured to sense a reaction of a protection target in the vehicle; and a microphone configured to receive a noise associated with the driving frequency and the switching frequency of the switching element. The microphone may comprise a filter configured to pass frequencies in a configured audible frequency band. The controller may comprise a memory configured to store data on noise associated with the inverter and data on noise associated with the driving motor for one or more motor speeds. The controller may be configured to: activate a protection mode associated with one or more protection targets in the vehicle; and control the switching frequency of the inverter by changing, based on a noise frequency associated with the inverter not satisfying the target noise frequency, the switching frequency. The one or more protection targets may comprise at least one of: an infant in the vehicle; a toddler in the vehicle; a child in the vehicle; or a fetus of a pregnant woman in the vehicle.

An apparatus may comprise: a battery configured to supply power for a vehicle; a driving motor configured to operate the vehicle; at least one sensor configured to sense data for determining a noise frequency associated with the vehicle; and a controller configured to control, based on sensing data provided from the at least one sensor, the noise frequency associated with the vehicle to generate a noise satisfying a target noise frequency, wherein the target noise frequency is associated with an audible frequency range of one or more protection targets in the vehicle.

The controller may be configured to: activate a protection mode associated with the one or more protection targets in the vehicle; and control a switching frequency of an inverter of the vehicle by changing, based on a noise frequency associated with the inverter not satisfying the target noise frequency, the switching frequency. The one or more protection targets may comprise at least one of: an infant in the vehicle; a toddler in the vehicle; a child in the vehicle; or a fetus of a pregnant woman in the vehicle.

BRIEF DESCRIPTION OF THE DRAWINGS

The accompanying drawings, which are included to provide a further understanding of the disclosure and are incorporated in and constitute a part of this application, illustrate embodiment(s) of the present disclosure and together with the description serve to explain the principle of the invention. In the drawings.

DETAILED DESCRIPTION

Figure 1:
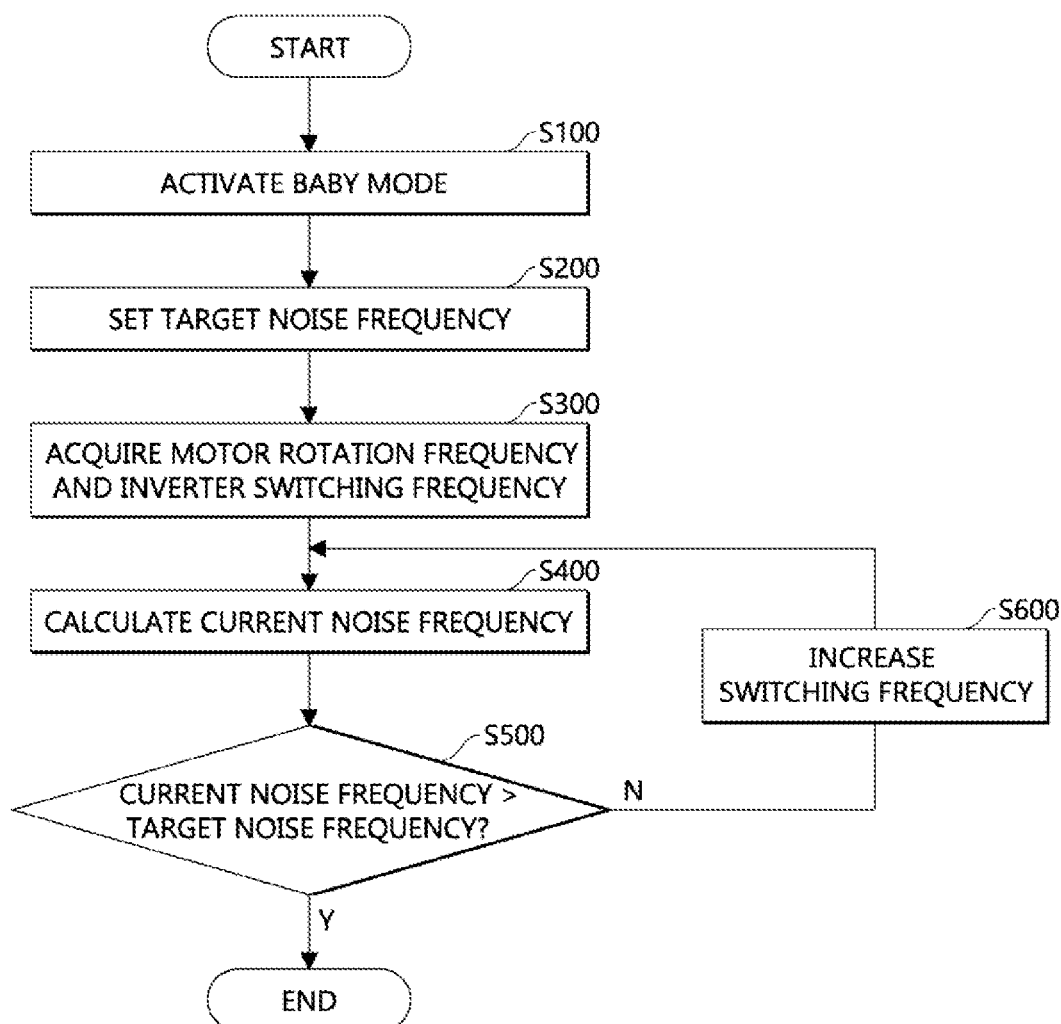
FIG. 1 is a flowchart showing a method of controlling an inverter of an eco-friendly vehicle based on a protection mode.

Various exemplary examples will now be described more fully with reference to the accompanying drawings, in which only some examples are shown. Specific structural and functional details disclosed herein are merely representative for the purpose of describing some examples.

Accordingly, while exemplary embodiment(s) may be variously modified and may be taking alternative forms, embodiment(s) thereof are shown by way of example in the drawings and will herein be described in detail. It should be understood, however, that there is no intent to limit the present disclosure to the particular examples disclosed herein. Rather, exemplary embodiment(s) are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of examples of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiment(s) only and is not intended to be limiting of exemplary embodiment(s) of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Meanwhile, when a certain embodiment is capable of being realized in a different manner, functions or operations specified in a specific block can be executed in an order different from that shown in a flowchart. For example, two consecutive blocks can be executed simultaneously, or can be executed in the reverse order, depending on the related function or operation.

Hereinafter, a method and apparatus for controlling an inverter of an eco-friendly vehicle based on a baby mode will be described with reference to the accompanying drawings.

FIG. 1 is a flowchart showing a method of controlling an inverter of an eco-friendly vehicle based on a protection mode (e.g., a hearing protection mode, a baby mode, a baby protection mode, etc.).

Referring to FIG. 1, based on an input of a driver of a vehicle, an apparatus (e.g., a controller of the vehicle) may activate a protection mode (e.g., a hearing protection mode, a baby mode, a baby protection mode, a fetus protection mode, etc.). The driver may provide the input using an input device mounted in a vehicle or a portable terminal device capable of wirelessly communicating with a vehicle-driving device. The apparatus may activate a baby mode (S100), for example, to prevent or reduce a hearing loss of a baby or a passenger under a certain age (e.g., under 6 years old). The input device may be a navigation device mounted in the vehicle, other types of equipment mounted in the vehicle, or a portable device associated with the vehicle (e.g., a smartphone linked to the vehicle). The portable terminal device is not limited to any specific type of input device, so long as the same is capable of wirelessly communicating with the vehicle-driving device through short-range wireless communication, such as Bluetooth®. The condition in which the protection mode is activated may be, for example, the case in which an infant younger than three years of age or a child from three years of age up to the age of eligibility to attend an elementary school is seated in a car seat mounted in the vehicle, or the case in which a pregnant woman (e.g., a woman determined to have one or more embryos or fetuses in utero) is in the vehicle.

The apparatus may set a target noise frequency (S200), for example, after activating the protection mode. A process of setting the target noise frequency will be described later in more detail with reference to the flowchart illustrated in FIG. 2.

If the target noise frequency is set, a motor rotation frequency and an inverter switching frequency of the vehicle that is traveling may be acquired (e.g., in real time) (S300). The apparatus may retrieve the motor rotation frequency and the inverter switching frequency from a storage or may receive them via a network interface. The apparatus may calculate a current noise frequency based on the acquired motor rotation frequency and inverter switching frequency (S400).

The apparatus may compare the calculated current noise frequency with the target noise frequency. For example, the apparatus may determine whether the current noise frequency, which may be calculated based on the motor rotation frequency and the inverter switching frequency, is outside of a certain harmful frequency band (e.g., 20 Khz-28 Khz) audible to target audience (e.g., infants, toddlers, a fetus of a pregnant woman, etc.) (S500).

If the current noise frequency is within the harmful frequency band audible to the target audience, the sense of hearing of the target audience in the vehicle may be negatively affected (e.g., damaged) by the noise. Therefore, if the current noise frequency is lower than the harmful target noise frequency, the apparatus may change the inverter switching frequency, for example, based on the real-time motor rotation frequency. For example, the inverter switching frequency may be changed (e.g., increased above 28 kHz so that the target audience cannot hear the higher frequency sound) (S600), and the process may return to the step of calculating the current noise frequency. If the current noise frequency is outside of the frequency band audible to the target audience (e.g., infants, etc.), the inverter switching frequency may not be changed (e.g., increased) any further.

Figure 2:
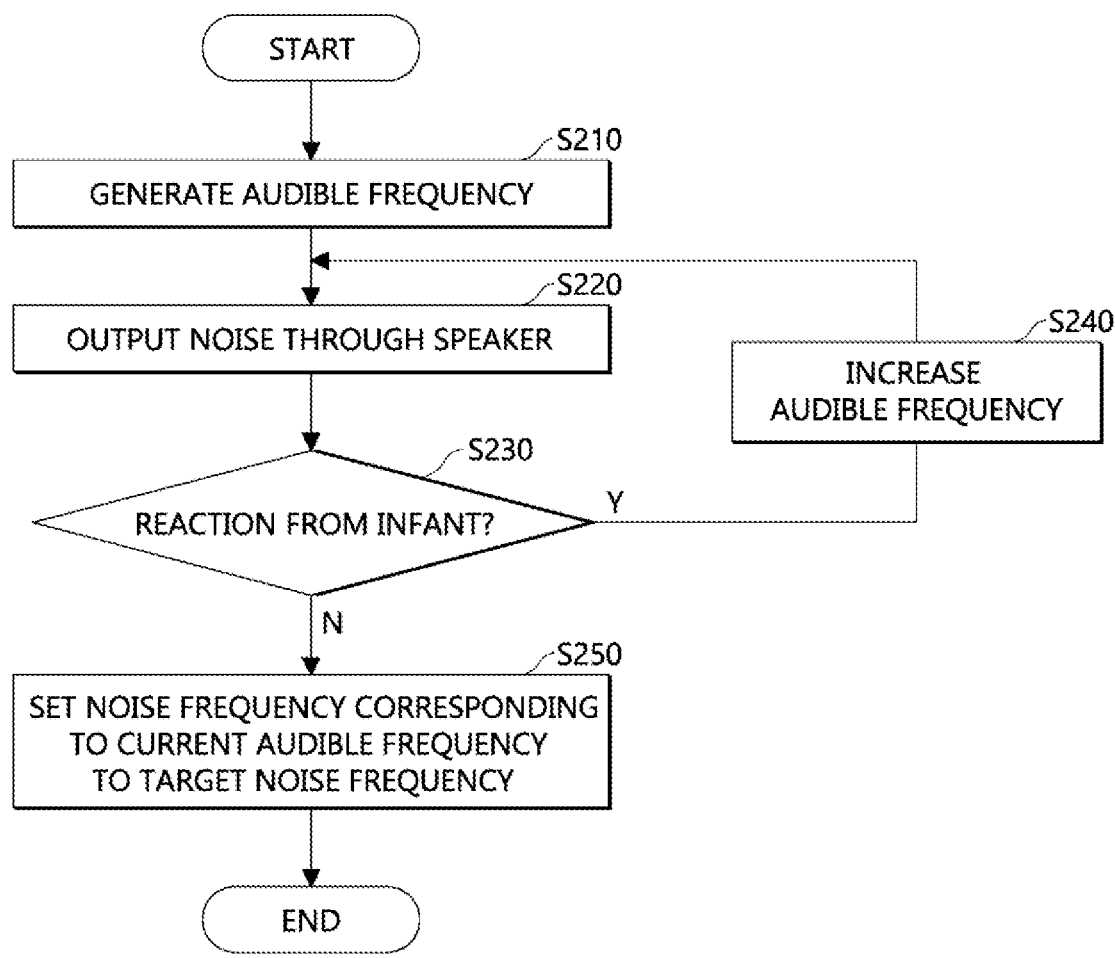
FIG. 2 is a detailed flowchart showing a process of calculating a target noise frequency in the method of controlling an inverter of an eco-friendly vehicle based on a protection mode.

FIG. 2 is a detailed flowchart showing a process of calculating the target noise frequency in the method of controlling an inverter of an eco-friendly vehicle based on a protection mode.

Referring to FIG. 2, in order to calculate the target noise frequency, an apparatus may generate a signal (e.g., sound, an audible signal) with a fundamental audible frequency (S210), and sound with the fundamental audible frequency (e.g., noise) may be output through an output device (e.g., a speaker) (S220).

The apparatus may determine whether the target audience (e.g., infant, etc.) in the vehicle reacts to the noise (S230).

If the target audience (e.g., infant, etc.) reacts to the noise, it may be determined that the current audible frequency is within the frequency band audible to the target audience, and the current audible frequency may be changed (e.g., increased) (S240). A passenger (e.g., the driver of the vehicle) may provide a feedback (e.g., by providing an input indicating that the target audience is reacting to the noise with the fundamental audible frequency). A sensor (e.g., a camera, a microphone, etc.) may detect the reaction of the target audience (e.g., a baby crying in response to the sound with the fundamental audible frequency). Subsequently, sound with the increased frequency may be output.

If the target audience (e.g., infants, etc.) does not react to the noise, it may be determined that the current audible frequency is outside of the frequency band audible to the target audience (e.g., infants, etc.). Accordingly, the noise frequency corresponding to the current audible frequency may be set to the target noise frequency (e.g., by the apparatus) (S250).

Figure 3:
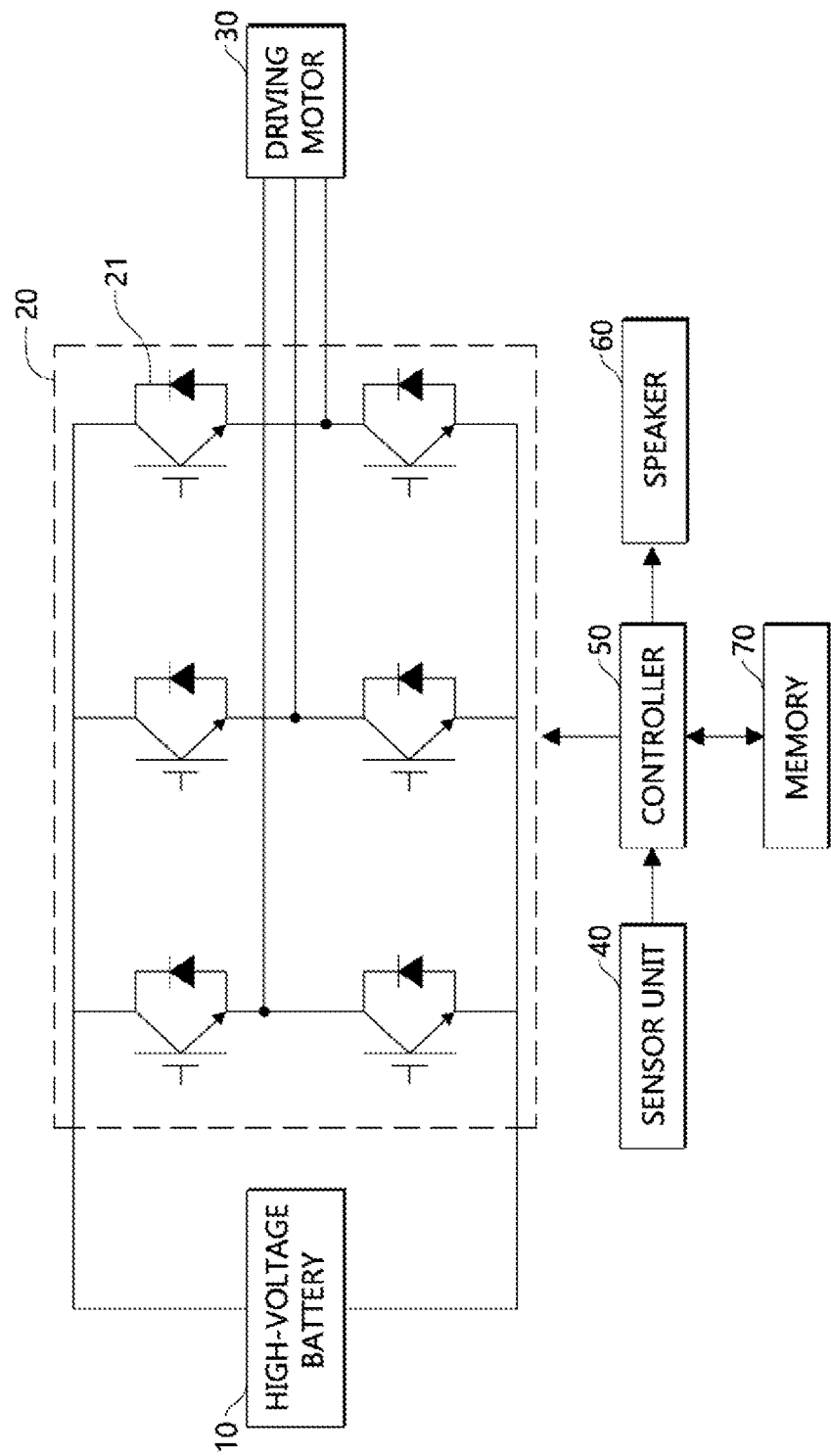
FIG. 3 is a block diagram showing the configuration of an apparatus for controlling an inverter of an eco-friendly vehicle based on a protection mode.

FIG. 3 is a block diagram showing the configuration of an apparatus for controlling an inverter of an eco-friendly vehicle based on a protection mode.

As shown in FIG. 3, an apparatus 100 for controlling an inverter of an eco-friendly vehicle may include a battery (e.g., a high-voltage battery 10), an inverter 20, a driving motor 30, a sensor 40 (e.g., a sensor array, a sensor unit including a plurality of sensors, etc.), a controller 50, a speaker 60, and a memory 70.

If the memory 70 is separately provided, the controller 50 may perform data read and write operations via an interface (e.g., a data bus line). Additionally or alternatively, the memory 70 may be included in the controller 50. In this case, the memory 70 may store data on inverter noise and data on motor driving noise for each motor speed (rpm) in the form of mapped data.

The high-voltage battery 10 may supply direct-current (DC) power, which may be used as main power for driving the vehicle.

The inverter 20 may convert the DC power supplied from the high-voltage battery 10 into alternating-current (AC) power. An eco-friendly vehicle, such as a pure electric vehicle (EV), a hybrid electric vehicle (HEV), a plug-in hybrid electric vehicle (PHEV), or a fuel cell electric vehicle (FCEV), may employ an electric motor as a power source for driving the vehicle. Direct current from the high-voltage battery 10 may be converted into three-phase alternating current by the inverter 20, and the three-phase alternating current may be applied to the driving motor 30 to drive the driving motor 30. The driving force of the driving motor 30 may be transferred to a driving wheel, and the wheels of the vehicle may rotate to move the vehicle.

The inverter 20 may be provided therein with a plurality of switching elements 21. The switching frequency (or switching period) may be defined as a period during which one or more of the plurality of switching elements 21 in the inverter 20 performs an ON/OFF operation once. Each of the switching elements 21 may be an insulated gate bipolar transistor or any other types of switching elements.

The inverter 20 may operate in order to drive the driving motor 30, and the driving motor 30 driven by the inverter 20 may provide the driving force required for driving the vehicle to the driving wheel.

The controller 50 may control the switching operation time (e.g., according to the switching frequency), of one or more of the switching elements 21, for example, based on the driving frequency of the driving motor 30 and the switching frequency of the inverter 20. The driving frequency of the driving motor 30 and the switching frequency of the inverter 20 may be detected by the sensor 40, so that the apparatus 100 may determine whether the current noise frequency corresponds to the target noise frequency stored in the memory 70.

Figure 4:
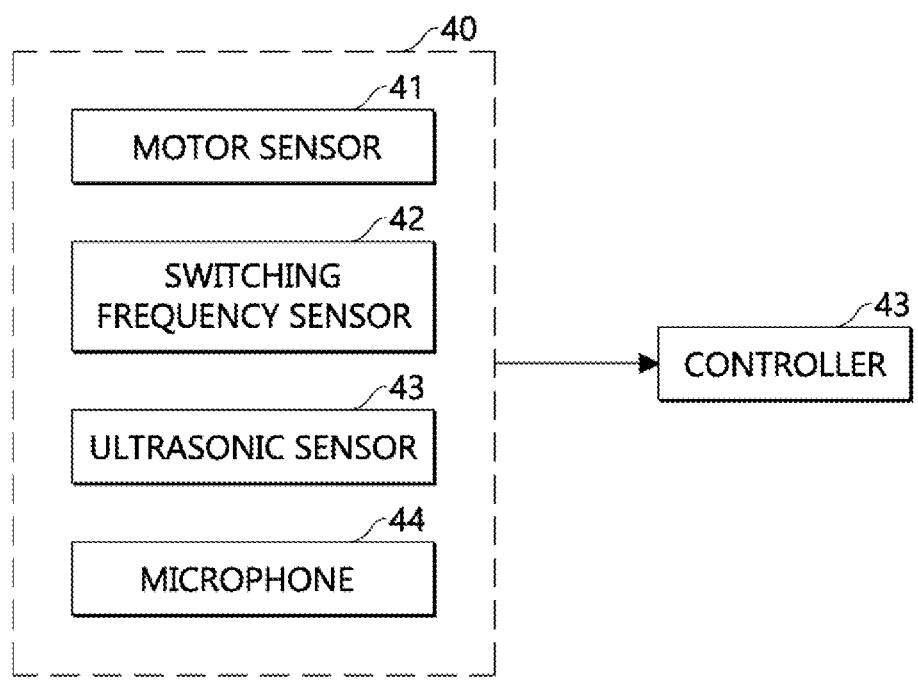
FIG. 4 is a block diagram showing the configuration of a sensor unit in the apparatus for controlling an inverter of an eco-friendly vehicle based on a protection mode.

FIG. 4 is a block diagram showing the configuration of a sensor unit in the apparatus for controlling an inverter of an eco-friendly vehicle based on a protection mode. As shown in FIG. 4, the sensor 40 may include at least one of: a motor sensor 41, a switching frequency sensor 42, an ultrasonic sensor 43, or a microphone 44.

The motor sensor 41 may sense/detect the driving frequency of the driving motor 30 according to the rotational speed of the driving motor 30, and may provide data on the sensed driving frequency to the controller 50.

The switching frequency sensor 42 may sense/detect the switching operation period of one or more of the switching elements 21 in the inverter 20, and may provide data on the sensed switching operation period to the controller 50.

The ultrasonic sensor 43 may sense/detect the reaction (e.g., motion, crying, etc.) of the target audience (e.g., infants, etc.) in the vehicle or in the car seat, and may provide data on the sensed motion to the controller 50. For example, if the controller 50 sets the target noise frequency, the driver may recognize the reaction of the target audience (e.g., infants, etc.) to the noise output through the speaker 60, and may input a control request signal to the controller 50 in order to change the audible frequency, or the ultrasonic sensor 43 may sense the reaction of the target audience (e.g., infant), and may provide a sensing signal to the controller 50.

If the controller 50 sets the target noise frequency, the microphone 44 may detect sound to provide feedback about the magnitude of the sound, output from the speaker 60, to the controller 50 so that the controller 50 may calculate/determine the current noise frequency. The microphone 44 may include a filter (not shown) configured to pass only an audible frequency band. For example, if the audible frequency is changed and sound having the changed frequency is output through the speaker 60 in order to set the target noise frequency, and if the output sound is outside of the audible frequency band, the frequency of the output sound may be blocked by the filter (e.g., in the microphone 44 or a filtering system), and no signal may be provided to the controller 50 from the microphone 44. The controller 50 may determine that the currently changed frequency is the target noise frequency.

Figure 5:
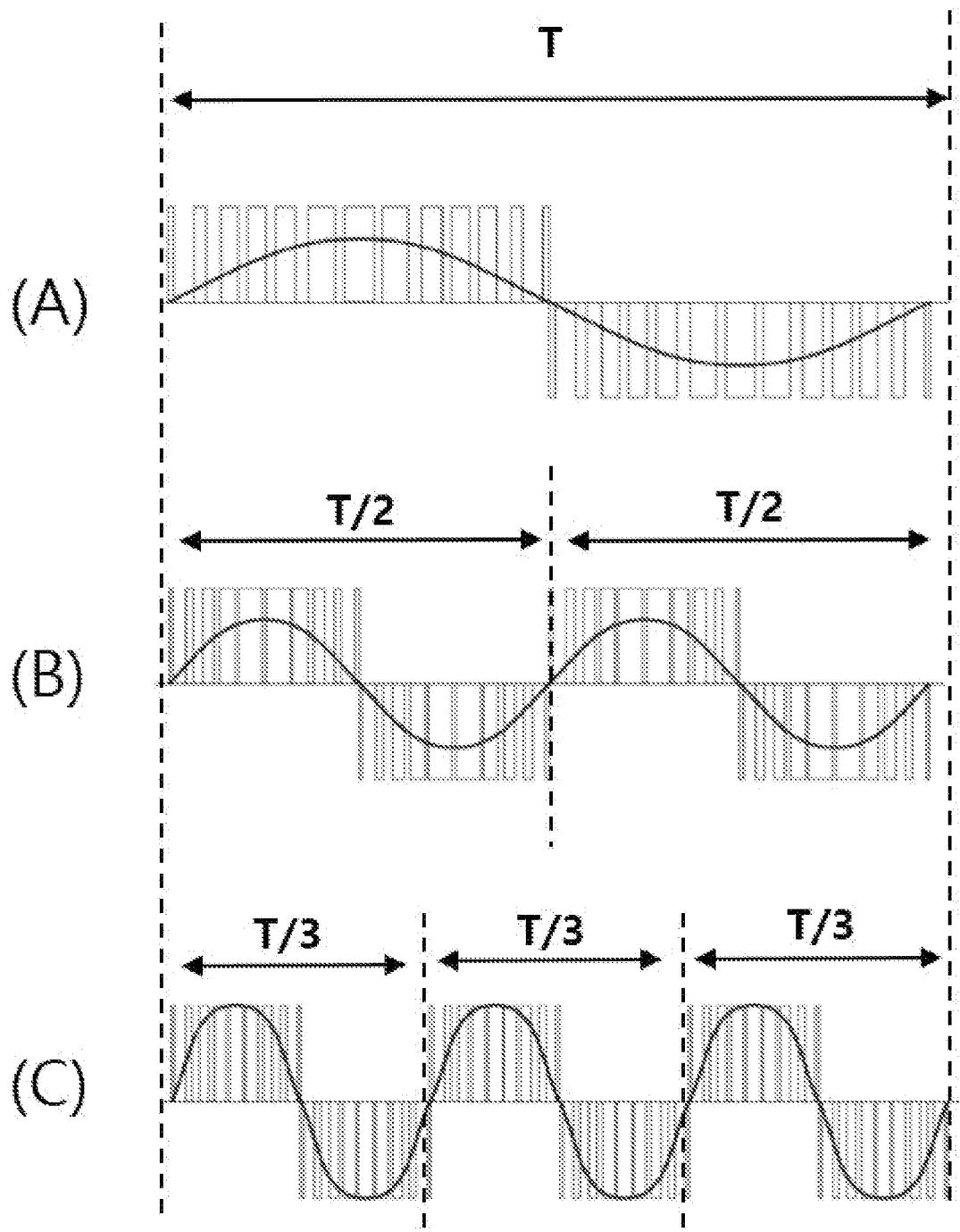
FIG. 5 is a waveform diagram showing variation in a switching frequency by operation of the apparatus for controlling an inverter of an eco-friendly vehicle based on a protection mode.

FIG. 5 is a waveform diagram showing variation in the switching frequency by the operation of the apparatus for controlling an inverter of an eco-friendly vehicle based on a protection mode.

If the switching frequency of the inverter is increased, switching loss may occur. If switching loss increases, the motor system including the inverter may be less desirable from the aspects of operational efficiency and fuel efficiency of the vehicle. Nevertheless, the increased switching frequency may provide an improved user experience for the passengers of the vehicle (e.g., by preventing or reducing the risks of hearing loss of the target audience in the vehicle) at the cost of the deteriorated operational efficiency and fuel efficiency of the vehicle.

The switching frequency of the inverter 20 may be changed based on the control signal output from the controller 50, and consequently, the rotational speed of the driving motor 30 may be changed.

The controller 50 may select the switching frequency of the inverter 20, and may generate a pulse width modulation (PWM) signal based on the selected switching frequency to control the operation of the inverter 20. The inverter 20 may convert received AC power into DC power through rectification and smoothing and to inversely convert the DC power to AC power having a desired voltage or frequency. Here, the process of generating the AC power may employ a pulse width modulation (PWM) scheme or any other scheme for power conversion. For example, the inverter 20 may generate a sine wave by adjusting the On-duty of the PWM signal at a very high speed.

If the current switching frequency of one or more of the switching elements 21 of the inverter 20 has a form in which one sine wave is output for a certain time period T, as shown in FIG. 5 (part (A) of FIG. 5), and if the current noise frequency is lower than the target noise frequency, the controller 50 may increase the switching frequency.

As shown in FIG. 5 (part (B) of FIG. 5), the On-duty of the signal applied to each of the switching elements 21 in the inverter 20 may be adjusted such that one sine wave is output for a time period of T/2, that is, two sine waves are output during the time period T. As a result, the current noise frequency is increased.

However, if the current noise frequency is still lower than the target noise frequency, the controller 50 may increase the switching frequency such that, as shown in FIG. 5 (part (C) of FIG. 5), one sine wave may be output during a time period of T/3, that is, three sine waves are output for the time period T. As a result, the current noise frequency is increased.

In order to achieve the high-speed switching operation, one or more of the switching elements 21 of the inverter 20 may employ an insulated gate bipolar transistor (IGBT) or any other switching element.

In this example, although the signal period is represented by "T/2" or "T/3", this is given merely by way of example. The rate at which the switching frequency is increased may be set differently (e.g., by the user or the apparatus). Alternatively, the switching frequency may be increased at a fixed rate with respect to the current switching frequency.

The aspects of the present disclosure may be applied to any type of eco-friendly vehicle, such as an HEV, an EV, a PHEV, or FCEV, which is driven by the tractive force of a motor (e.g., a surface permanent magnet synchronous motor (SPMSM), an interior permanent magnet synchronous motor (IPMSM), an induction motor (IM), or the like), which may be controlled by an inverter.

An object of the present disclosure is to provide a method and apparatus for controlling an inverter of an eco-friendly vehicle, which are capable of protecting the sense of hearing of an infant in the eco-friendly vehicle.

Another object of the present disclosure is to provide a method and apparatus for controlling an inverter of an eco-friendly vehicle, which are capable of protecting the sense of hearing of an infant at the cost of loss of a desired switching frequency.

A further object of the present disclosure is to provide a method and apparatus for controlling an inverter of an eco-friendly vehicle, which are capable of changing a switching frequency of the inverter in real time in order to generate a noise frequency outside of a frequency band audible to infants.

In order to accomplish the above and other objects, a method of controlling an inverter of an eco-friendly vehicle based on a baby mode may include activating a baby mode, setting a target noise frequency, acquiring a motor rotation frequency and an inverter switching frequency in real time when the eco-friendly vehicle is traveling, calculating a current noise frequency, determining whether the current noise frequency is higher than the target noise frequency, and changing the inverter switching frequency based on the real-time motor rotation frequency to generate noise corresponding to the target noise frequency when the current noise frequency is lower than the target noise frequency.

In order to accomplish the above and other objects, an apparatus for controlling an inverter of an eco-friendly vehicle based on a baby mode may include a high-voltage battery configured to supply DC power for use as main power for the eco-friendly vehicle, an inverter configured to convert the DC power supplied from the high-voltage battery into AC power, a driving motor configured to be driven by the AC power supplied from the inverter, a sensor unit including a plurality of sensors, and a controller configured to control the switching frequency of the inverter based on sensing data provided from the sensor unit.

The controller may control the switching operation time of a switching element constituting the inverter.

The switching element may include an insulated gate bipolar transistor (IGBT).

The sensor unit may include a motor sensor configured to sense the driving frequency of the driving motor, a switching frequency sensor configured to sense the switching frequency of the switching element in the inverter, an ultrasonic sensor configured to sense motion of an infant in the eco-friendly vehicle, and a microphone configured to receive noise generated by the driving frequency and the switching frequency.

The switching element may include an insulated gate bipolar transistor.

The microphone may include a filter configured to pass only an audible frequency band.

One or more controllers described herein may perform overall control such that each of the components may perform their functions normally and/or may perform one or more operations described herein. The controller(s) may be implemented in the form of hardware (e.g., processor, memory, etc.), or may be implemented in the form of software (e.g., firmware, application, etc.), or may be implemented in the form of a combination of hardware and software. The controller(s) may be implemented as a microprocessor, but is not limited thereto. For example, the controller(s) may include at least one of a central processing unit (CPU), a graphics processing unit (GPU), a field-programmable gate array (FPGA), an application specific integrated circuit (ASIC), a system-on-chip, etc.

As is apparent from the above description, the method and apparatus for controlling an inverter of an eco-friendly vehicle based on a protection mode may prevent or reduce noise generated when the eco-friendly vehicle is driven from affecting the sense of hearing of a target audience (e.g., infants, etc.) in the vehicle, whose audible frequency band is higher than that of an adult passenger, thereby preventing hearing loss of the target audience.

Although various examples of the present disclosure have been described for illustrative purposes, those skilled in the art would appreciate that various modifications, additions and substitutions are possible, without departing from the scope and spirit of the invention as disclosed in the accompanying claims.

What is claimed is:

1. A method comprising:
   determining, by an apparatus, a noise frequency associated with an inverter of a vehicle;
   determining that the noise frequency does not satisfy a target noise frequency; and
   changing, based on a motor rotation frequency, a switching frequency of the inverter to generate a noise satisfying the target noise frequency, wherein the changing of the switching frequency of the inverter comprises changing, at a rate settable by a user, the switching frequency of the inverter.

2. The method of claim 1, further comprising:
   generating, based on the changed switching frequency, a pulse-width modulation (PWM) signal to control an operation of the inverter.

3. The method of claim 1, further comprising:
   activating a protection mode associated with one or more protection targets in the vehicle;
   setting, based on the protection mode, the target noise frequency; and
   acquiring the motor rotation frequency and the switching frequency of the inverter in real time while the vehicle is traveling.

4. The method of claim 3, wherein the one or more protection targets comprises at least one of:
   an infant in the vehicle;
   a toddler in the vehicle;
   a child in the vehicle; or
   a fetus of a pregnant woman in the vehicle.

5. The method of claim 3, wherein the setting the target noise frequency comprises:
   generating an audible frequency;
   outputting a sound having the audible frequency;
   determining a reaction of the one or more protection targets; and
   outputting, based on the determined reaction, a sound having an increased audible frequency.

6. The method of claim 1, wherein the changing the switching frequency of the inverter comprises changing the switching frequency of the inverter by increasing the switching frequency at a fixed rate.

7. The method of claim 1, wherein the determining the noise frequency associated with the inverter of the vehicle comprises sensing a sound using a microphone.

8. The method of claim 7, wherein the microphone comprises a filter configured to pass frequencies in a configured audible frequency band.

9. An apparatus comprising:
   a battery configured to supply direct current (DC) power for a vehicle;
   an inverter configured to convert the DC power to alternating current (AC) power;
   a driving motor, based on the AC power, configured to operate the vehicle;
   at least one sensor; and
   a controller configured to:
      activate a protection mode associated with one or more protection targets in the vehicle; and
      control, based on sensing data provided from the at least one sensor, a switching frequency of the inverter by changing, at a rate settable by a user, the switching frequency of the inverter to generate a noise satisfying a target noise frequency.

10. The apparatus of claim 9, wherein the controller is configured to control a switching operation time of a switching element of the inverter.

11. The apparatus of claim 10, the switching element comprises an insulated gate bipolar transistor (IGBT).

12. The apparatus of claim 10, wherein the at least one sensor comprises:
   a motor sensor configured to sense a driving frequency of the driving motor;
   a switching frequency sensor configured to sense a switching frequency of the switching element of the inverter;
   an ultrasonic sensor configured to sense a reaction of a protection target in the vehicle; and
   a microphone configured to receive a noise associated with the driving frequency and the switching frequency of the switching element.

13. The apparatus of claim 12, wherein the microphone comprises a filter configured to pass frequencies in a configured audible frequency band.

14. The apparatus of claim 9, wherein the controller comprises a memory configured to store data on noise associated with the inverter and data on noise associated with the driving motor for one or more motor speeds.

15. The apparatus of claim 9, wherein the controller is configured to:
   control the switching frequency of the inverter by changing, based on a noise frequency associated with the inverter not satisfying the target noise frequency, the switching frequency.

16. The apparatus of claim 9, wherein the one or more protection targets comprises at least one of:
   an infant in the vehicle;
   a toddler in the vehicle;
   a child in the vehicle; or
   a fetus of a pregnant woman in the vehicle.

17. An apparatus comprising:
a battery configured to supply power for a vehicle;
a driving motor configured to operate the vehicle;
at least one sensor configured to sense data for determining a noise frequency associated with the vehicle; and
a controller configured to:
- activate a protection mode associated with one or more protection targets in the vehicle;
- control, based on sensing data provided from the at least one sensor, the noise frequency associated with the vehicle to generate a noise satisfying a target noise frequency, wherein the target noise frequency is associated with an audible frequency range of the one or more protection targets in the vehicle; and
- control a switching frequency of an inverter of the vehicle by changing, based on a noise frequency associated with the inverter not satisfying the target noise frequency, the switching frequency at a rate settable by a user.

18. The apparatus of claim 17, wherein the one or more protection targets comprises at least one of:
an infant in the vehicle;
a toddler in the vehicle;
a child in the vehicle; or
a fetus of a pregnant woman in the vehicle.

* * * * *